March 20, 1956    A. Y. DODGE    2,738,689
TRANSMISSION
Filed July 25, 1950    2 Sheets-Sheet 1
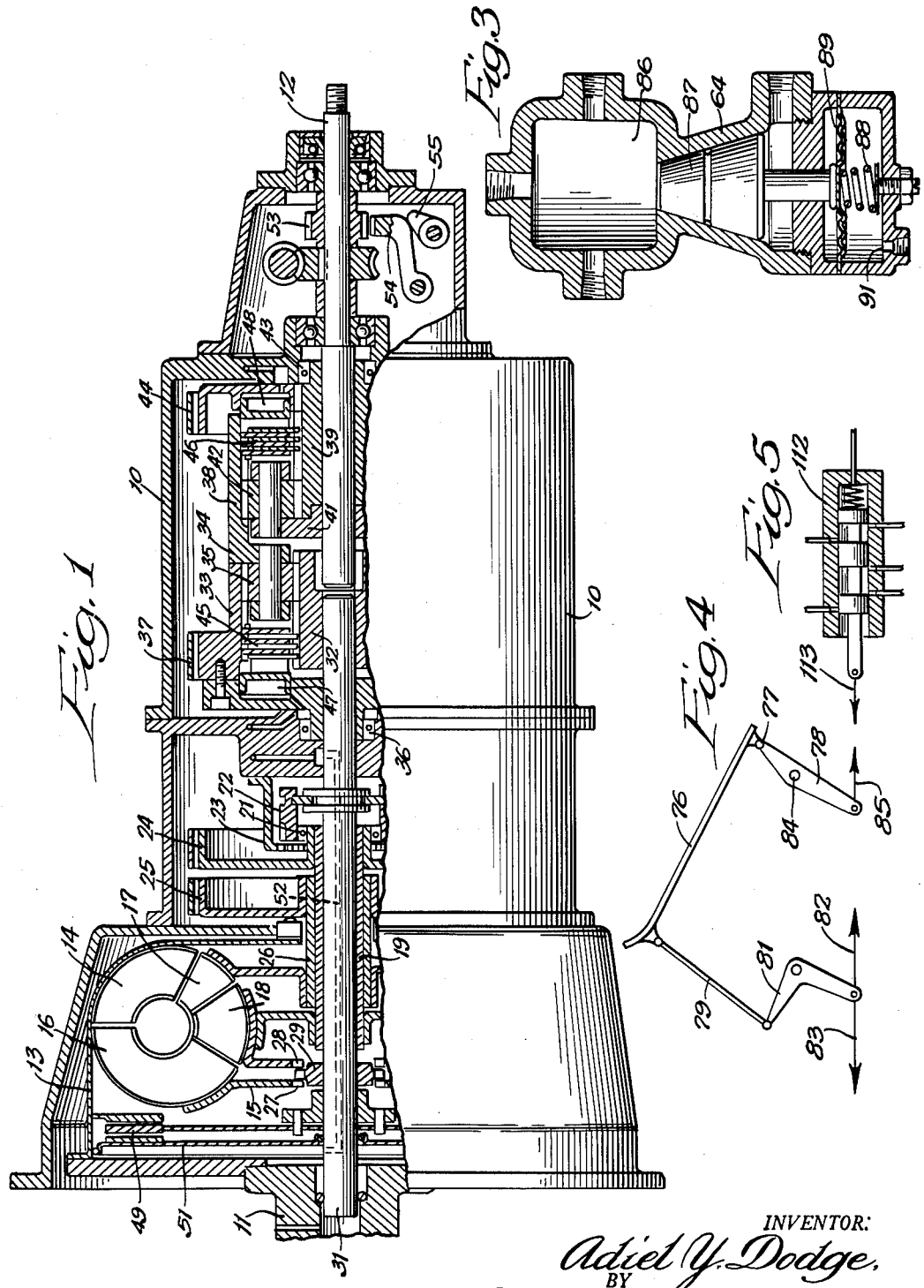
INVENTOR:
Adiel Y. Dodge,
BY
Edwin L. Bostic
ATTORNEY

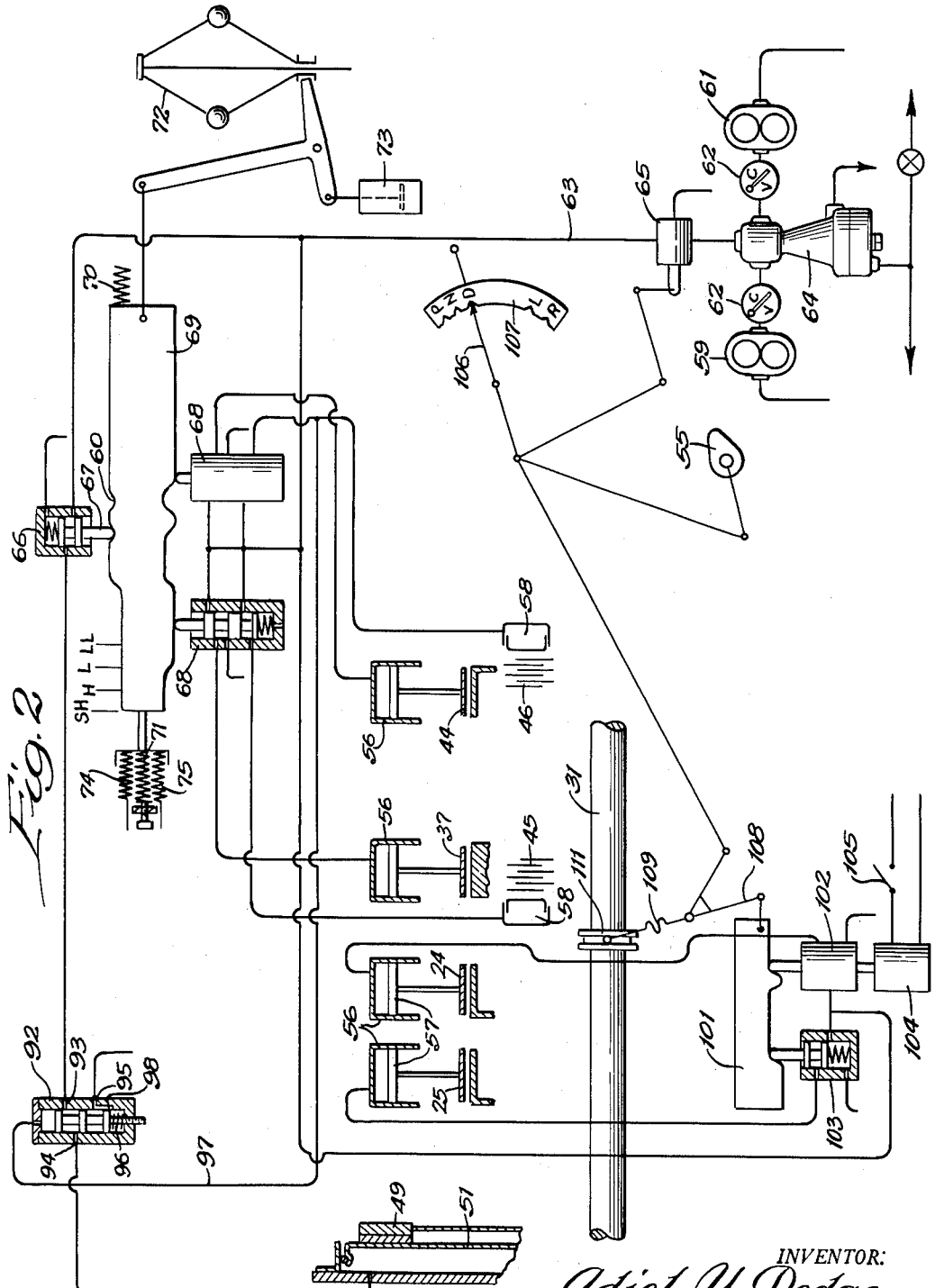

United States Patent Office 2,738,689
Patented Mar. 20, 1956

2,738,689

TRANSMISSION

Adiel Y. Dodge, Rockford, Ill.

Application July 25, 1950, Serial No. 175,791

12 Claims. (Cl. 74—732)

This invention relates to transmissions and, more particularly, to variable speed transmissions for automotive vehicles and to controls therefor.

For economical operation of automotive vehicles with the desired performance characteristics, it is necessary to provide relatively high speed driving ratios under cruising conditions with a wide range of available ratios to meet varying operating conditions. It is also highly desirable for the operator to maintain a certain degree of control over the operating ratio at any given time. For example, rapid acceleration regardless of economy should be available when desired by the operator or the operator should be able to select an economical operating condition.

It is one of the objects of the present invention to provide a transmission embodying these several desirable characteristics and in which an easy and rapid change of operating conditions can be obtained.

One of the chief objectives of this invention is to provide an automatic transmission which, under normal operating conditions, uses one automatic shift, but in which the driver may readily bring about additional automatic shifts.

Another object is to provide a transmission which requires relatively simple gearing and controls to provide a plurality of forward ratios and reverse. In the preferred embodiment, the gearing includes a pair of planetary gear sets connected in tandem and controlled through simple clutches and brakes.

Another object is to provide a transmission in which the reaction elements of the gear sets are held against reverse rotation by one-way brakes during normal forward drive and are held against rotation in either direction by mechanical brakes during reverse or emergency and low gear drive.

Still another object is to provide a transmission in which reverse is obtained by utilizing the stator of a hydraulic torque converter as the driving member holding the rotor to act as a stator. According to one feature, a shiftable positive clutch connects either the rotor or stator as the driving member and both the rotor and stator are braked during shifting to facilitate clutch engagement.

Another object is to provide a transmission in which the hydraulic torque transmitting device is shunted out by a mechanical clutch during high ratio operation, and the clutch is temporarily disengaged during ratio changes.

A further object is to provide a transmission which is controlled in response to speed and to torque as measured by the accelerator pedal position with an additional control provided by bodily shifting the accelerator pedal to maintain the transmission at a lower driving ratio or return it to a lower driving ratio when desired. This construction provides a simple and easy manual control by the operator for emergency conditions or, when desired, for rapid acceleration.

Another objective is to provide improved operating pressure control means whereby lower pressures will be maintained in the control system when high pressures are not required, responsive to engine manifold vacuum.

The above and other objects and advantages of the invention will be more readily apparent from the following description when read in connection with the accompanying drawings, in which Figure 1 is an axial section with parts in elevation of a transmission embodying the invention;

Figure 2 is a diagrammatic view of the control apparatus for the transmission;

Figure 3 is an enlarged section of the variable pressure relief valve;

Figure 4 is a side elevation illustrating the control pedal mounting, and

Figure 5 is a section of a control valve which may be operated by the control pedal.

As shown in Figure 1, the transmission comprises a housing 10 to be mounted in a vehicle in place of the usual transmission mechanism. The engine crank shaft or an extension thereof indicated at 11, constitutes the driving member for the transmission and the transmission driven shaft indicated at 12 may be connected to the wheels through the usual differential mechanism. The driving shaft 11 is connected to a hydraulic torque converter housing 13 which carries a set of impeller vanes 14. A rotor 15 is mounted in the housing and carries spaced sets of vanes 16 and 17 to be driven by liquid circulated by the impeller vanes. A set of stator vanes 18 is mounted between the two sets of rotor vanes and is supported by a sleeve 19.

A one way brake 21 acts between the sleeve 19 and a collar 22 which is formed with external teeth to engage complementary teeth on a ring 23 carried by the housing. When the collar 22 is in engagement with the ring 23 it will be held stationary so that the one way brake 21 will hold the stator 18 against reverse rotation. To hold the stator against rotation in either direction for hill braking and to assist in shifting, a mechanical brake 24 is provided connected to the sleeve 19. A similar mechanical brake 25 is connected through a sleeve 26 to the rotor to hold it against turning for reverse drive and to facilitate shifting.

The stator and rotor are provided with clutch members 27 and 28 for engagement by a shiftable positive clutch collar 29 so that either the stator or the rotor may be the output member of the torque converter. The collar 29 is splined or keyed to an intermediate driving shaft 31 which has a sun gear 32 connected thereto.

The sun gear 32 forms one of the gears of a first planetary differential gear set which includes a ring gear 33 and a gear carrier 34 carrying pinions 35 which mesh with the sun and ring gears. The ring gear 33 is held against reverse rotation by a one way brake 36 acting between the ring gear hub and a fixed casing part and may be held against rotation in either direction by a mechanical brake 37. The carrier 34 is connected to or integral with a ring gear 38 of a second planetary differential gear set which includes a sun gear 39 and a carrier 41 carrying pinions 42 which mesh with the sun and ring gears. The sun gear 39 is held against reverse rotation by a one way brake 43 and may be held against rotation in either direction by a mechanical brake 44. The carrier 41 is connected to the output shaft 12 and constitutes the output member of the transmission.

The planetary gear sets are adapted to be locked for unitary rotation by friction clutches 45 and 46 respectively, which connect the sun and ring gears of the respective sets. The clutches are adapted to be engaged by fluid motors 47 and 48 which are supplied with actuating fluid through passages in the transmission as shown, when the clutches are to be engaged.

The hydraulic torque converter is adapted to be shunted by a friction clutch 49 which is engaged by a pressure plate 51 to connect the driving shaft 11 directly to the intermediate shaft so that the clutch 49 will be engaged when pressure is supplied through the bore 52.

The output shaft 12 is adapted to be locked to brake the vehicle for parking or the like, by a pinion 53 on the output shaft which may be engaged by a pivoted pawl 54. The pawl is controlled by a cam 55 operated through a manual selector lever as described hereinafter.

The transmission as described provides an emergency low ratio, a normal low, a high, a super-high and a reverse. For all forward drives, collar 29 is shifted to engage the clutch member 27 so that the intermediate shaft 31 is driven by the rotor. For emergency low, the brakes 37 and 44 are engaged, the clutches 45 and 46 and 49 are disengaged, and the brakes 24 and 25 are both disengaged. At this time the drive is from the driving shaft through the torque converter in the usual way to drive the intermediate shaft 31 at reduced speed and increased torque. The speed is further reduced and the torque is further increased through the two planetary gear sets in series so that the output shaft is driven at a low speed ratio which transmits torque both to or from the wheels. This drive is employed only for emergency conditions or when starting from standstill when extremely high acceleration is desired or descending treacherous grades.

For normal low drive, the clutch 49 is disengaged, the clutch 46 is engaged, brake 44 is disengaged, brake 37 is engaged and clutch 45 is disengaged. At this time the drive is again through the torque converter in the usual manner and is further multiplied through the first planetary gear set. However, because the clutch 46 is engaged there is no further multiplication in the second gear set and a higher speed ratio than that of the emergency low drive will be produced.

For high speed drive, the clutch 49 may be engaged or may be left disengaged if it is desired for the torque converter to be effective, the clutch 46 is disengaged, the clutch 45 is engaged, the brake 37 is disengaged and the brake 44 is engaged. At this time the driving shaft drives mechanically through the clutch 49 and through the clutch 45 of the first gear set directly to the ring gear 38 of the second gear set. Since the ring gear is the driving member of this gear set, it will produce a lesser torque multiplication than the first gear set so that a still higher driving ratio is provided. For super-high the clutch 49 is engaged and both clutches 45 and 46 are engaged while all of the brakes are disengaged so that a direct 1–1 drive is produced.

It is contemplated that the present transmission shall be used with a rear axle having a ratio on the order of 2.4–1. With this rear axle the emergency low mechanical transmission ratio from engine to rear axle may be about 9.4–1, the low ratio may be about 6.2–1, the high ratio about 3.6–1, and the super-high direct. In at least the emergency low and low drives, these ratios are multiplied by the torque ratio increase of the hydraulic torque converter. This provides an extremely efficient transmission in cruising conditions with normal high and normal low ratios available easily and quickly when required.

For reverse, the collar 29 is shifted to the right to engage the clutch member 28 and at the same time the collar 22 is shifted to the right to free the one way brake 21. The brake 25 is engaged to hold the rotor against turning so that reaction of the liquid will drive the stator backwards. At the same time, clutches 45 and 46 are disengaged and brakes 37 and 44 are engaged. Thus the stator will drive backwards through the two gear sets in series to produce a mechanical reverse ratio of about 9.4–1.

The several clutches and brakes are adapted to be controlled by the control mechanism as illustrated diagrammatically in Figure 2. As shown, each of the brakes 24, 25, 37 and 44 is operated by a fluid motor including a cylinder 56 having a piston 57 slidable therein and connected to the corresponding brake. The construction is such that when pressure is supplied to the motors the corresponding brakes will be engaged. The clutches 45 and 46 are similarly operated by fluid motors 58, the clutches being engaged when fluid is supplied to the motors and being disengaged when there is no pressure on the motors.

Fluid for operating the several clutches and brakes is supplied by one or both of a pair of pumps 59 and 61 driven respectively by the driving and driven members of the transmission. In this way, fluid pressure is always available either when the engine is running or the output shaft is turning as when the vehicle is being pushed. The pumps are connected through check valves 62 to a main supply line 63. A pressure regulator valve 64 is connected to the supply line to regulate pressure therein and a bypass valve 65 is provided in the supply line. The bypass valve 65 is switched during neutral and park so that no pressure is available for operating the clutches and brakes. The supply line 63 is connected to a valve 66 for controlling the clutch 49. The valve 66 is a conventional spool valve which is normally urged to its closed or venting position to release the clutch 49 and which may be moved to its open position by a plunger 67. The supply line also connects to a pair of identical valves 68 for controlling the brakes 37 and 44 and the clutches 45 and 46. Each of the valves 68 as shown in section in Figure 2, is a double spool valve with an upper section controlling one of the brakes and a lower section controlling one of the clutches. The valves are normally urged to the brake engaging clutch releasing position by springs and may be moved physically to the illustrated position to release the brakes and engage the clutches.

The valves 66 and 68 are controlled by a shiftable cam bar 69 having cam surfaces thereon as illustrated, to shift the several valves in a predetermined sequence. The cam bar is normally urged to the right by an adjustable spring 71 and is urged to the left by a governor 72 which may be connected to the transmission output shaft to provide a shifting force proportional to the vehicle speed. A dash pot 73 may be connected to the governor to damp its shifting movements as desired.

To provide a manual control for the cam bar in addition to the automatic control produced by the governor 72 and spring 71 a pair of additional springs 74 and 75 are provided to urge the cam bar to the right. The springs 74 and 75 are adapted to be variably loaded by a special type of manual control which may correspond to the usual accelerator pedal and which is illustrated in Figure 4. The control pedal as shown comprises a pedal member 76 pivoted at 77 at the upper end of a lever 78 for pivotal movement in a vertical plane. At its upper end the pedal 76 is connected through a link 79 to a bell crank 81 whose lower end is connected through a connection 82 to the spring 75. The bell crank 81 may also be connected to the usual engine throttle through a connection 83.

The lever 78 is pivoted intermediate its ends at 84 and may be connected at its lower end through a connection 85 to the spring 74. When the accelerator pedal is disposed in the usual way to open the engine throttle, the spring 75 will be more heavily loaded to resist to a greater extent shifting of the cam bar 69 by the governor. This tends to retain the transmission in low operating range until a higher speed is reached. Additionally bodily shifting of the accelerator pedal in the same vertical plane will rock the lever 78 counterclockwise to increase the compression of the spring 74. In this way, the operator can vary the loadings of the springs 74 and 75 at will either to retain the transmission in low range until a higher speed is reached, or can cause a shift from a higher to a lower range when desired for rapid acceleration.

When desired, spring 70 may be employed to urge cam bar 69 to the left so that starts can normally be made in either "Low" or "Intermediate" by pre-arranged spring setting. By rocking the accelerator pedal 76 forward, spring 74 may be loaded to overpower spring 70, thereby bringing about a start in a lower ratio than would normally take place were not treadle 76 rocked forward. Bar 69 may also be notched at 60 to receive the valve actuator 67 to provide a detent action.

The relief valve 64 as best seen in Figure 3, is adapted to produce a varying hydraulic pressure in response to different operating conditions of the engine. As shown, the relief valve comprises a chamber 86 to receive liquid from pumps and has a tapered valve member 87 normally urged against its seat by a spring 88. The spring is housed in a chamber closed at its top by flexible diaphragm 89 connected to the valve and has a fluid connection 91 at its lower end to be connected to the engine intake manifold.

Under normal operating conditions the valve may be set to product a fluid pressure on the order of 120 pounds per square inch. However, under high manifold vacuum which will occur during throttling conditions, the pressure may drop to as low as 60 pounds per square inch. Under normal engine operation the pressure will fluctuate between these values being normally about 80 pounds per square inch. This reduction of the pressure when it is not needed relieves the load on the pumps thereby producing economical pump operation.

The clutch 49 is adapted to be temporarily released each time the valve 68 which controls the brake 44 and clutch 46 is operated. For this purpose, a valve 92 is provided in the connection between the valve 66 and the clutch 49. The valve 92 has a central inlet opening 93 connected to the outlet side of the valve 66, an outlet opening 94 connected to the clutch 49, and a vent opening 95. A double spool is slidable in the valve casing and is urged upward by a spring 96 so that the openings 93 and 94 will normally be connected through the lower half of the spool. A connection 97 from the upper part of the valve body is connected to the line between the clutch 58 and the valve 68 so that when the valve 68 is operated to engage the clutch the spool of valve 92 will be moved down.

As the spool moves downward, it first connects the clutch 49 to the vent 95 so that the clutch will be released and when the valve reaches its full lower position as illustrated, the openings 93 and 94 will again communicate through the upper part of the spool. The rate of travel of the valve spool may be determined by a small passage 98 around the lower land on the spool so that a delayed action will be produced. In this way the clutch 49 will be temporarily disengaged for a predetermined period each time pressure is applied to or released from the clutch motor 58.

With this construction when the clutch motor 58 is either engaged or disengaged to change the transmission ratio, the clutch 49 will be temporarily disengaged so that the torque converter will become effective to cushion any shock incident to the change in ratio.

The brakes 24 and 25 are controlled through a separate cam bar 101 which controls two single spool type valves 102 and 103. These valves are supplied with operating fluid from the connection 63 through a connection from the center part of each valve to connection 63 as shown, and are connected respectively to the motors for the brakes 24 and 25 so that when the valves are shifted downward by the cam bar 101 the motors will be supplied with fluid to engage the brakes.

The valve 102 may also be operated separately by a solenoid 104 controlled by a manual switch 105 to engage the brake 24 when desired. This enables the stator to be held against rotation to assist in braking the vehicle in descending hills or the like.

The cam bar 101 is shifted by means of a manual control lever 106 which constitutes the ratio selector lever for the operator. As shown, the lever is movable over a segment 107 to positions indicated as P, N, D, L and R. If desired, the L and R positions may be at a lower level than the P, D and N positions so that the lever must be swung out of its normal plane to select these conditions. The lever as shown is connected to the bypass valve 65 so that this valve will bypass when the lever is in the N or neutral position or park position and the bypass will be closed in all other positions. The lever is also connected to the cam 55 so that when it is moved to its P or park position, the pawl 54 will engage the pinion 53 to lock the transmission driven shaft. Additionally, the lever is connected to a link 108 which connects to the cam bar 101 to shift it as the lever is moved. The lever 108 is connected through a flexible section 109 to a shifting collar 111 which controls the one way clutch ring 22 and which is also connected to the clutch collar 29 to shift it.

When the lever is moved to its P or park position as explained above, the output shaft of the transmission will be locked to hold the vehicle against accidental movement. When the lever is moved to its neutral position, the valve 65 will bypass so that no fluid can be supplied and all of the brakes and clutches will be disengaged. When the lever is moved to its L or low position, the transmission is in its emergency low ratio and will provide a low gear drive effective to transmit torque in both directions as explained above. Movement of the lever to the R or reverse position will produce the reverse drive condition described above.

In shifting into or out of reverse, both of the brakes 24 and 25 will be temporarily engaged through valves 102 and 103 to hold both the stator and the rotor of the torque converter so that both of the clutch members 27 and 28 are stationary. This prevents clashing of the clutch teeth and enables the shift to be effected easily. In the event the teeth do not mesh properly the spring 109 will yield so that the shift bar may be moved to its desired position. On the first fractional rotation of either of the clutch members the teeth on the clutch collar will slide into mesh. The cam bar 101 is illustrated shifted to the left, to the drive position in which both of the valves are closed. On shifting to the right, the valve 102 will be opened in the low position and will close while valve 103 opens in the reverse position.

In the D position which is the normal forward driving position, the transmission is automatically controlled by the governor 72 subject to manual control by the operator through the accelerator pedal. Normally the vehicle will start in the low position as described above, in which the clutch 46 is engaged. If the operator desires to start in emergency low for rapid acceleration, he can cause the cam bar 69 to shift to the extreme right by rocking the accelerator pedal bodily forward to compress the spring 74 and at the same time by depressing the accelerator pedal to compress the spring 75. This will shift the cam bar 69 to its extreme right hand position in which both of the brakes 37 and 44 are engaged and the clutches 45 and 46 are disengaged. Except when this is done the normal start will be in low gear drive as described above, with the right hand valve 68 opened to engage the clutch 46.

As the speed increases, the cam bar 69 will shift to the left to operate the valve 68 for the clutch 45 and brake 37 to engage the clutch and disengage the brake. At the same time the valve 68 controlling the brake 44 and clutch 46 will be released by the cam depression at the right of the cam bar to engage the brake 44 and disengage the clutch. At this time also the valve 66 will be opened to engage the clutch 49 to produce the high speed drive condition described above. As the speed increases still further, the cam bar 69 will be shifted to the illustrated position in which both of the valves 68 are moved to engage both of the clutches 45 and 46 and disengage the brakes 37 and 44. Thus at this time the super high speed drive described above will be produced.

Instead of controlling the spring 75 by bodily shifting the accelerator pedal this movement of the accelerator pedal may be utilized directly to control the valve 68 which controls the brake 44 and the clutch 46. As illustrated in Figure 5, a valve identical to the two valves 68 indicated at 112 may be connected through the link 113 to the link 85 on the lever 78. In this way, the valve 112 is directly controlled by the shifting movements of the accelerator pedal and replaces the valve 68 at the right in Figure 2. Thus the operator may control directly shifting between the high and super high driving conditions.

Under normal operating conditions this transmission functions using one automatic shift, that is, under normal conditions the transmission starts in what we have called "High" and later shifts to "Super High" ratio. But should a more rapid start be desired, the operator can cause the transmission to start in the "low" ratio by depressing the accelerator pedal beyond wide open throttle position, in which case the start will be made in low gear, and the transmission will automatically change into "High" and later "Super High."

In the event that still more torque is desired, such as starting rapidly on a steep incline, the transmission may be caused to start functioning in the "Emergency-Low" ratio and will shift through "Low," "High" into "Super High" as the vehicle accelerates. This is caused by both depressing the accelerator pedal all the way down and rocking the accelerator pedal forward. In this way we have provided a transmission which functions with the desired number of shifts and may be immediately and conveniently caused to change from one characteristic to another.

A good torque converter, operating in a 1:1 torque range, has not-to-exceed 6% slip—from that on down to 1½% slip as the load decreases.

It is found that clutch 49 may be built with very smooth operating characteristics—in other words a considerably long period of slip—since during its period of slip the hydraulic unit will help pick up the load. Therefore, the clutch 49 is carrying only a small proportion of the load with the hydraulic unit carrying the remainder so that a very smooth clutch can be used without excessive wear.

By the combination of clutch 49 and the hydraulic unit, loads may be picked up exceedingly smoothly; therefor we fined it beneficial to momentarily release clutch 49 whenever a speed ratio is changed, thereby causing the combination of clutch 49 and the hydraulic unit to pick up the load smoothly.

This applies to those ratios wherein clutch 49 was previously engaged prior to the change or shift about to take place. By this practice wear on clutch 45 and 46 and brakes 37 and 44 is reduced, in addition to creating a smoother-operating shift.

While one embodiment of the invention has been shown and described in detail, it will be understood that this is for the purpose of illustration only and is not to be taken as a definition of the scope of the invention, reference being had for this purpose to the appended claims.

What is claimed is:

1. A transmission comprising a hydraulic torque converter having a driving impeller, a rotor, and a stator, a one way brake to hold the stator against reverse rotation, means to release the one way brake, mechanical brakes for the rotor and stator to hold them against rotation, an output shaft, positive clutch means shiftable to connect the output shaft selectively to the rotor or the stator, a movable control member for the positive clutch means, means operated by the control member to control the one way brake releasing means, and means operated by the control member to engage both of the mechanical brakes during shifting of the positive clutch means and selectively to engage the mechanical brakes when the positive clutch means is shifted to one or the other of its connecting positions.

2. A transmission comprising a hydraulic torque converter having a driving impeller, a rotor, and a stator, a one way brake to hold the stator against reverse rotation, means to release the one way brake, mechanical brakes for the rotor and stator to hold them against rotation, an output shaft, positive clutch means shiftable to connect the output shaft selectively to the rotor or the stator, a movable control member for the positive clutch means, means operated by the control member to control the one way brake releasing means, fluid motor units to operate the mechanical brakes, valves to control the fluid motor units, and cam means operated by the control member and controlling the valves to engage both of the mechanical brakes during shifting of the positive clutch means and selectively to engage the mechanical brakes when the positive clutch means is shifted to one or the other of its connecting positions.

3. A transmission comprising a gear set, controllable means in the gear set to change the driving ratio thereof, a hydraulic torque transmitting device having driving and driven members, the driven member being connected to the gear set to drive it, a mechanical clutch to connect the driving member of the hydraulic device directly to the driven member of the hydraulic device, means to operate the controllable means to change the driving ratio of the gear set, means controlled by operation of the last named means to disengage the clutch, and time delay means in the last named means to predetermine the time of disengagement of the clutch.

4. A transmission comprising a gear set, controllable means in the gear set to change the driving ratio thereof, a hydraulic torque transmitting device having driving and driven members, the driven member being connected to the gear set to drive it, a mechanical clutch to connect the driving and driven members of the hydraulic device, fluid motor units to operate the controllable means and to engage the clutch, a control valve to control the fluid motor for the controllable means, and a control valve to control the clutch connected to the first named valve temporarily to disengage the clutch when the first named control valve is operated.

5. A transmission comprising a gear set, controllable means in the gear set to change the driving ratio thereof, a hydraulic torque transmitting device having driving and driven members, the driven member being connected to the gear set to drive it, a mechanical clutch to connect the driving and driven members of the hydraulic device, fluid motor units to operate the controllable means and to engage the clutch, a control valve to control the fluid motor for the controllable means, a control valve to control the fluid motor for the clutch, control means to operate the valves in a predetermined sequence, and means responsive to operation of the first named control valve to control the fluid motor for the clutch temporarily to disengage the clutch.

6. A transmission comprising a gear set, controllable means in the gear set to change the driving ratio thereof, a hydraulic torque transmitting device having driving and driven members, the driven member being connected to the gear set to drive it, a mechanical clutch to connect the driving and driven members of the hydraulic device, fluid motor units to operate the controllable means and to engage the clutch, a control valve to control the fluid motor for the clutch, a shiftable cam member engageable with the control valves to operate them in predetermined sequence, speed responsive means urging the cam member in one direction, a movable control member, a spring between the movable control member and the cam member variably loaded by the control member to urge the cam member in the opposite direction, and means responsive to operation of the first named control valve to control the fluid motor for the clutch temporarily to disengage the clutch.

7. A transmission comprising a gear set, controllable means in the gear set to change the driving ratio thereof, a hydraulic torque transmitting device having driving and driven members, the driven member being connected to the gear set to drive it, a mechanical clutch to connect the driving and driven members of the hydraulic device, fluid motor units to operate the controllable means and to engage the clutch, a control valve to control the fluid motor for the clutch, a shiftable cam member engageable with the control valves to operate them in predetermined sequence, speed responsive means urging the cam member in one direction, a control pedal mounted for pivoting and bodily shifting movement, springs variably loaded by pivoting and shifting movements respectively of the control pedal and urging the cam member in the opposite direction, and means responsive to operation of the first named control valve to control the fluid motor for the clutch temporarily to disengage the clutch.

8. A transmission comprising a pair of planetary differential gear sets, each including a pair of gears and a carrier having pinions thereon meshing with the gears, the carrier of the first gear set being connected to one of the gears of the second gear set and the carrier of the second gear set being the transmission output member, brake means to hold the other gear of the second gear set and one of the gears of the first gear set against rotation, a clutch in each gear set to connect two of the elements thereof for rotation of the gear set as a unit, a hydraulic torque transmitting device having driving and driven members, the driven member being connected to the other gear of the first gear set to drive it, a clutch to connect the driving and driven members of the hydraulic devices, fluid motor units to operate the brakes and clutches, valves to control the motor units, a shiftable cam member to control the valves in predetermined sequence, speed responsive means to urge the cam member in one direction, a pedal mounted for pivotal and bodily shifting movement, and a pair of springs variably loaded by pivotal and shifting movements respectively of the pedal and urging the cam member in the opposite direction.

9. A transmission comprising a pair of planetary differential gear sets, each including a pair of gears and a carrier having pinions thereon meshing with the gears, the carrier of the first gear set being connected to one of the gears of the second gear set and the carrier of the second gear set being the transmission output member, brake means to hold the other gear of the second gear set and one of the gears of the first gear set against rotation, a clutch in each gear set to connect two of the elements thereof for rotation of the gear set as a unit, a hydraulic torque transmitting device having driving and driven members, the driven member being connected to the other gear of the first gear set to drive it, a clutch to connect the driving and driven members of the hydraulic device, fluid motor units to operate the brakes and clutches, valves to control the motor units, a shiftable cam member to control the valves in predetermined sequence, speed responsive means to urge the cam member in one direction, the brake means being engaged and the clutches disengaged at low speeds and as the speed increases one of the brakes being disengaged and the clutch for the corresponding gear set being engaged, the clutch for the hydraulic device being engaged and finally the brake for the other gear set being disengaged and the clutch being engaged, a pedal mounted for pivotal and bodily shifting movement, and a pair of springs variably loaded by pivotal and bodily shifting movement of the pedal respectively and urging the cam member in the other direction.

10. A transmission comprising a gear set, controllable means in the gear set to change the driving ratio thereof, fluid motor means to operate the controllable means, a control valve for the motor means, a shiftable member to operate the control valve, speed responsive means urging the shiftable member in one direction, a pedal mounted for pivotal and bodily shifting movement, and a pair of springs variably loaded by pivotal and bodily shifting movement respectively of the pedal and urging the shiftable member in the other direction.

11. A transmission comprising a gear set, controllable means in the gear set to change the driving ratio thereof, fluid motor means to operate the controllable means, a control valve for the motor means, a shiftable member to operate the control valve, speed responsive means urging the shiftable member in one direction, a pedal mounted for pivotal movement in a vertical plane and for bodily shifting movement in the same plane, and a pair of springs variably loaded by pivotal and shifting movements respectively of the pedal and urging the shiftable member in the other direction.

12. A transmission comprising a gear set, a plurality of controllable means in the transmission selectively operable to provide different transmission ratios, a plurality of fluid motor units to operate the controllable means respectively, a control valve for each of the motor units, a shiftable cam member to operate the control valves in a predetermined sequence, speed responsive means urging the cam member in one direction, a pedal mounted for pivotal and bodily shifting movement, and a pair of springs variably loaded by pivotal and shifting movements respectively of the pedal and urging the cam member in the opposite direction.

References Cited in the file of this patent

UNITED STATES PATENTS

| Number | Name | Date |
|---|---|---|
| 1,667,565 | Radcliffe | Apr. 24, 1928 |
| 1,907,009 | Rocknell | May 2, 1933 |
| 1,978,172 | Sinclair | Oct. 23, 1934 |
| 2,084,522 | Cotal | June 22, 1937 |
| 2,152,113 | Van Lammaren | Mar. 28, 1939 |
| 2,155,198 | Lawrence | Apr. 18, 1939 |
| 2,185,730 | Griswold | Jan. 2, 1940 |
| 2,228,082 | Krome | Jan. 7, 1941 |
| 2,260,406 | Roche | Oct. 28, 1941 |
| 2,282,949 | Dolza | May 12, 1942 |
| 2,291,424 | Wichorek | July 28, 1942 |
| 2,316,390 | Biermann | Apr. 13, 1943 |
| 2,332,593 | Nutt et al. | Oct. 26, 1943 |
| 2,343,955 | Cotterman | Mar. 14, 1944 |
| 2,372,817 | Dodge | Apr. 3, 1945 |
| 2,397,634 | Voytech | Apr. 2, 1946 |
| 2,418,378 | Voytech | Apr. 1, 1947 |
| 2,528,585 | Farkas et al. | Nov. 7, 1950 |
| 2,642,168 | Black et al. | June 16, 1953 |

FOREIGN PATENTS

| Number | Country | Date |
|---|---|---|
| 450,034 | Great Britain | July 9, 1936 |